March 5, 1957 A. W. GAUBATZ 2,784,354
ELECTRICAL INSTALLATION
Filed Aug. 4, 1953 3 Sheets-Sheet 1

INVENTOR
Arthur W. Gaubatz
BY
Paul Fitzpatrick
ATTORNEY

March 5, 1957

A. W. GAUBATZ 2,784,354

ELECTRICAL INSTALLATION

Filed Aug. 4, 1953

INVENTOR
Arthur W. Gaubatz
BY
Paul Fitzpatrick
ATTORNEY

United States Patent Office 2,784,354
Patented Mar. 5, 1957

2,784,354
ELECTRICAL INSTALLATION

Arthur W. Gaubatz, Indianapolis, Ind., assignor to General Motors Corporation, Detroit, Mich., a corporation of Delaware Application August 4, 1953, Serial No. 372,270

6 Claims. (Cl. 317—113)

My invention relates to electrical gear such as may be used, for example, in control systems for aircraft engines. The invention, as described herein, is applied to a relay box which provides for the mounting and connection of a number of relays in such a control system. The invention is particularly concerned with an improved arrangement for connecting the leads running from the aircraft engine and other parts of the control thereof to individual relays or other electrical devices, such that any individual relay or instrument may be very quickly and easily removed and replaced by another, and the electrical connections are held securely notwithstanding the provision for quick connection and disconnection.

The principal objects of the invention are to improve electrical wiring arrangements, particularly for aircraft, and to provide an improved plug-in arrangement for electrical devices.

The nature of the invention will be more clearly apparent from the appended specification and the accompanying drawings, in which.

Figure 1:
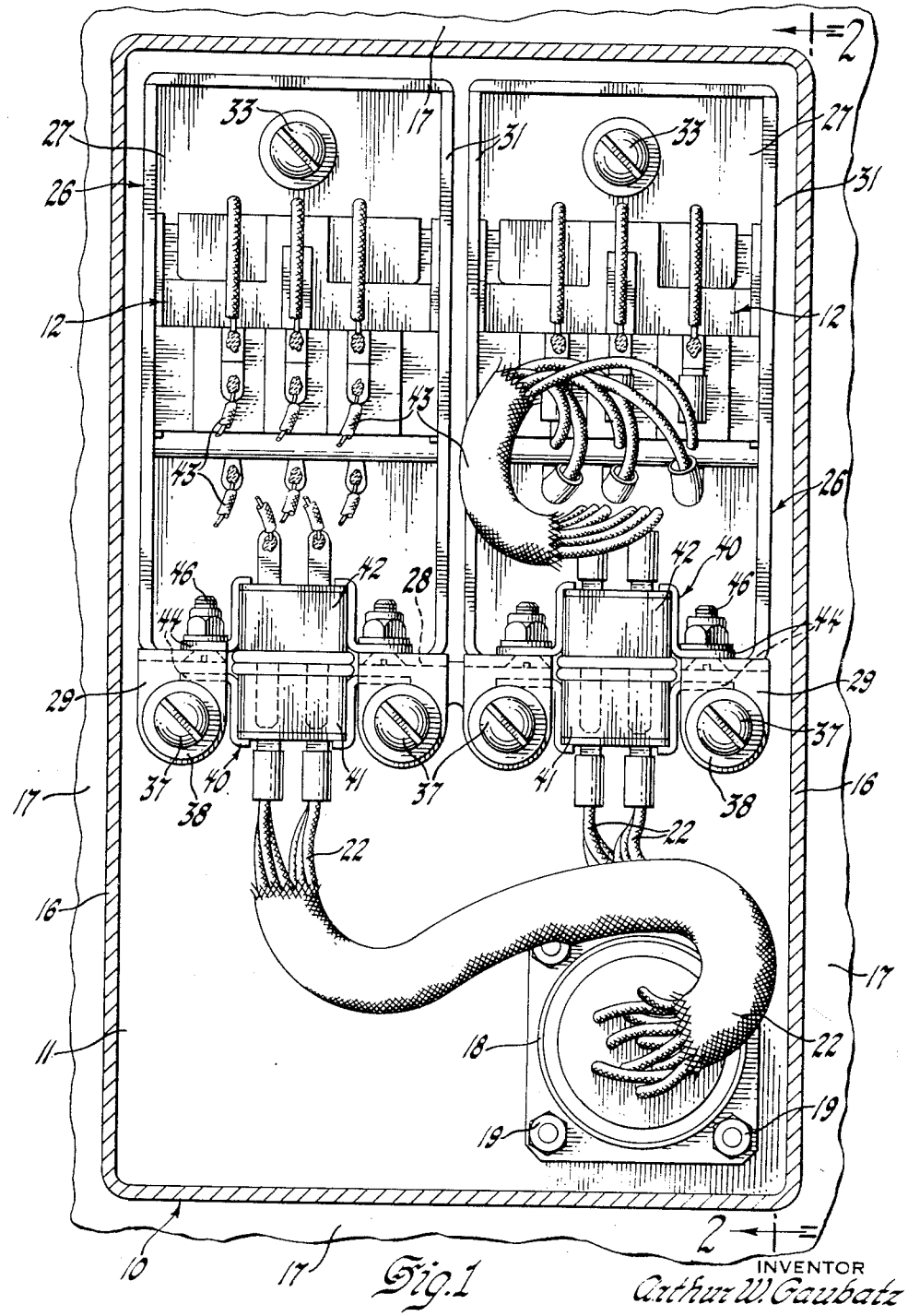
Fig. 1 is an elevation view, with the cover cut away, of a relay box installation.
Figure 2:
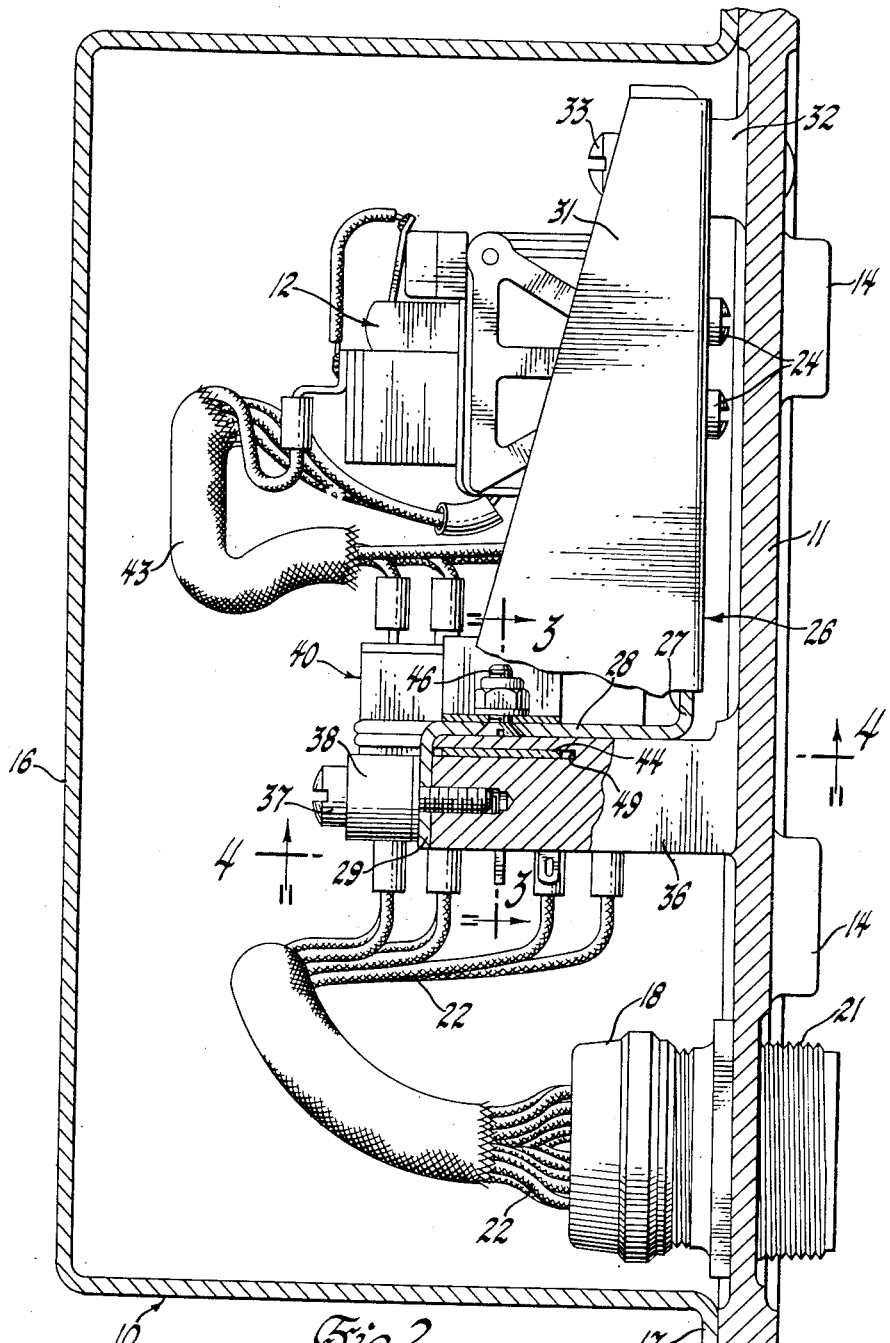
Fig. 2 is a view taken on the plane indicated by the line 2—2 in Fig. 1, with parts cut away.

Referring to Figs. 1 and 2, the illustrative relay box installation 10 comprises a base plate 11 on which are mounted two relays 12 which may be of known commercial type. The base plate or support 11 is provided with bosses 14 which may be tapped to receive mounting screws (not shown) by which the box may be mounted. The relays and wires mounted on the base plate are protected by a cover 16 formed with a flange 17 which may be secured to the margin of the base plate in any suitable manner by means which are not shown. The circuits running to the relay box are brought in through a multiple connector including a connector half 18, a flange on which is fixed to the base plate by bolts 19. The connector half 18 extends through a hole in the base plate and includes a threaded end 21 to receive a ferrule on the other half of the connecter (not shown) to which the external wiring is fixed. This connector may be of known type and, therefore, requires no description. As illustrated, all of the external circuits go through the connector 18 to which are connected a number of leads 22 extending to the relays 12. It may be, of course, that some leads run directly between the relays rather than to the exterior of the box, in which case they would not necessarily be led into the connector 18.

Figure 3:
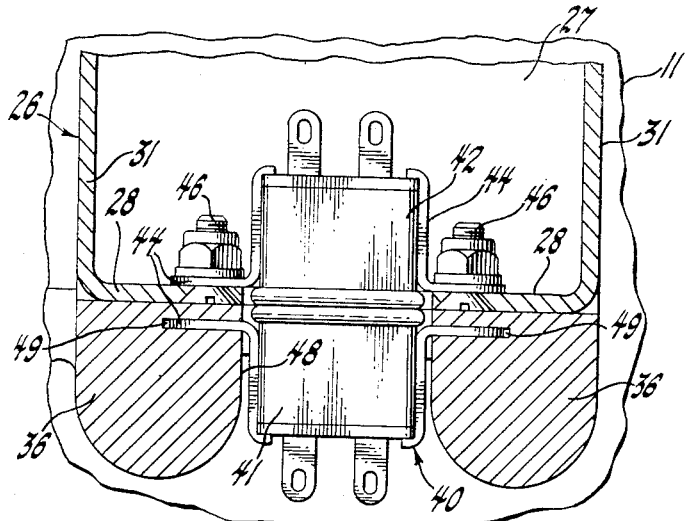
Fig. 3 is a sectional view of a connector installation taken on the plane indicated by the line 3—3 in Fig. 2.

Each relay or other electrical device 12 is attached in appropriate manner, as by machine screws 24, to a mounting bracket 26 which, in turn, is mounted on the base plate 11. As will be most clearly apparent from Figs. 1, 2, and 3, a typical bracket 26 comprises a base portion 27 lying generally parallel to the support 11, a flange 28 extending outwardly at right angles to the support, and two tabs 29 at the end of the flange 28. Side plates or flanges 31 extend from the flange 28 on each side of the base 27. The mounting bracket 26 may be of various forms or may be of a standard size adapted for mounting various components. The back plate 27 of the bracket 26 rests on a tapped boss 32 on the support to which it is secured by a machine screw 33.

The flanges 28 and 29 abut a ledge or shelf 36 extending outwardly from the base plate 11 and which may be cast integral therewith or welded thereto. Each bracket 26 is additionally held in place by two machine screws 37 which extend through spacer washers 38 and through the tabs 29 into the shelf 36. Each bracket 26 with its associated relay is thus mounted in the relay box by the three screws 33, 37 for ready removal and replacement.

The leads 22 are coupled to the relays through separable connectors 40, each comprising a lower half 41 and an upper half 42. These connectors may be commercially available, separable connectors of the multiple pin and socket type with sufficient contact points for the requirements of the particular device 12. The leads 22 are connected to the lower half 41 of the connectors and the upper halves 42 are connected through leads 43 to the coils, contacts, or other parts of the device 12. Each half of the connector has fixed thereon two mounting flanges 44. The mounting flanges of the upper connector half are fixed to the flange 28 by machine bolts 46, the heads of which are countersunk into the flange 28. Thus, the relay 12, the mounting bracket 26, the upper connector half 42, and the wiring 43 form a subassembly which may be installed or replaced as a unit. As appears most clearly in Fig. 3, the flange 28 is cut away so that the lower face of the connector 42 is exposed and the lower face of the connector is preferably in the plane of the lower face of the flange 28.

Figure 4:
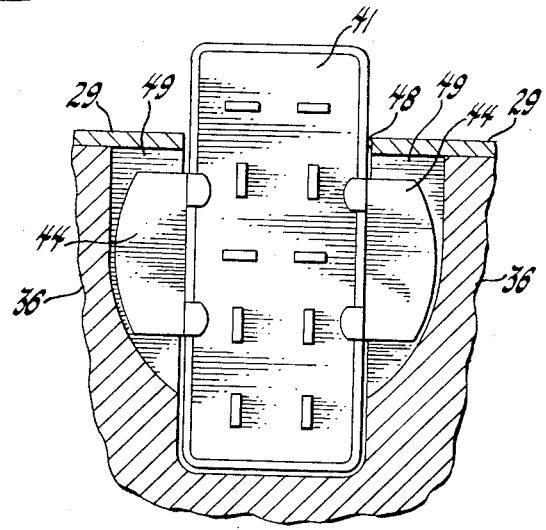
Fig. 4 is a detail sectional view taken on the plane indicated by the line 4—4 in Fig. 2.
Figure 5:
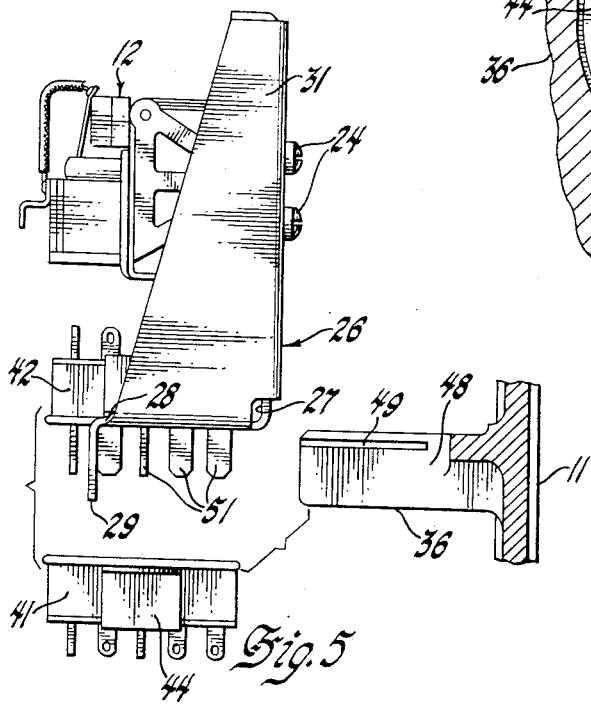
Fig. 5 is an exploded view illustrating the plug-in connection arrangement. (Wiring is omitted from Figs. 3, 4, and 5.)

The ledge or shelf 36 is likewise cut away at 48 below the connector part 42 to receive the connector half 41. This connector half likewise is provided with mounting flanges 44. As is most clearly apparent from Figs. 4 and 5, when the connector is received in the gap 48 in the shelf 36 the mounting flanges 44 extend into saw-cut notches or slots 49 extending into the shelf 36.

As will be apparent, the contact pins 51 on the upper connector half determine the alignment of the two half connectors. The mounting of the flanges 44 in the saw-cuts 49 makes it impossible for the lower half of the connector to pull away from the lower half. It should be noted, however, that the flanges 44 fit into the saw-cuts 49 with sufficient vertical clearance so that they can slide readily and with clearance around the ends of the flanges so that some lateral shifting or turning of the lower connector half is permitted so that it is free to align itself with the upper connector half which is bolted in fixed position to the mounting bracket 26.

Thus, with the internal wiring of the relay 12 coupled to the connector half 42 and with the external wiring 22 on the connector half 41, all that is necessary to install the relay is to plug the connector 40 together, push the mounting bracket into position with the flange 44 of the lower connector sliding into the saw-cut 49, and install the mounting screws 33, 37. The relay may be removed by reversing this process, and it is apparent that replacement for purpose of repair is very easily accomplished without any danger of a faulty installation as would be the case if the wires were attached in the usual manner.

Shock and jars in service cannot separate the connector, yet the mounting of the two parts of the connector provides sufficient freedom to avoid binding or cramping of the connector.

The installation shown herein for purposes of illustration embodies only two relays. As will be apparent, the principles of the invention may be embodied in boxes containing a large number of relays or instruments and, if desired, a number of external connections 18 may be provided. It is not necessary to illustrate further multiplication of these parts in order to explain the principles of the invention.

It will also be apparent that the devices 12 may be any type of electrical equipment such as transformers, rectifiers, amplifiers, etc., other than relays, and that the nature and structure of the operating devices mounted on the plate 26 is immaterial to the invention.

By virtue of the quick disconnect coupling 18, the entire relay box may be removed for service or checking and replaced by an entire new assembly. If, on the other hand, one particular relay or instrument is known to be defective or to require checking, it may be removed individually and replaced by a substitute without disturbing the other instruments. It will be apparent that this arrangement is highly desirable to facilitate servicing of complicated control gear in aircraft as well as in other installations.

The description herein of the preferred embodiment of the invention for the purpose of explaining the principles thereof is not to be considered as limiting the invention, since modifications of structure may be made within the principles of the invention by the exercise of skill in the art.

I claim:

1. An electrical installation comprising, in combination, a support, an electrical device demountably supported thereon, said device including one half of a separable connector fixed thereto and demountable therewith for receiving external connections thereto, a second separable connector half mating with the first-mentioned connector half, a third separable connector half mounted on the support and adapted to receive external connections to the said installation, conductors interconnecting the third connector half and the second connector half, and interengaging means on the support and said second connector half providing a dovetail coupling therebetween when the first and second connector halves are mated and the said device is mounted on the support, the dovetail coupling locking the first and second connector halves against separation but providing freedom for aligning movement and for removal of the second connector half with the first connector half.

2. An electrical installation comprising, in combination, a support, an electrical device demountably supported thereon, said device including one half of a separable connector fixed thereto and demountable therewith for receiving external connections thereto, a second separable connector half mating with the first-mentioned connector half, a third separable connector half mounted on the support and adapted to receive external connections to the said installation, conductors interconnecting the third connector half and the second connector half, and interengaging means on the support and said second connector half provided by a flange on the connector half and a slot defined by the support providing a dovetail coupling therebetween when the first and second connector halves are mated and the said device is mounted on the support, the dovetail coupling locking the first and second connector halves against separation but providing freedom for aligning movement and for removal of the second connector half with the first connector half.

3. An electrical installation comprising, in combination, a support, a number of electrical devices demountably supported thereon, each said device including one half of a separable connector fixed thereto and demountable therewith for receiving external connections thereto, a second separable connector half mating with each of the first-mentioned connector halves, a third separable connector half mounted on the support and adapted to receive external connections to the said installation, conductors interconnecting the third connector half and the second connector halves, and interengaging means on the support and each said second connector half providing a dovetail coupling therebetween when the first and second connector halves are mated and the corresponding device is mounted on the support, the dovetail coupling locking the first and second connector halves against separation but providing freedom for aligning movement and for removal of the second connector half with the first connector half.

4. An electrical installation comprising, in combination, a support, a number of electrical devices demountably supported thereon, each said device including one half of a separable connector fixed thereto and demountable therewith for receiving external connections thereto, a second separable connector half mating with each of the first-mentioned connector halves, a third separable connector half mounted on the support and adapted to receive external connections to the said installation, conductors interconnecting the third connector half and the second connector halves, and interengaging means on the support and each said second connector half provided by a flange on the connector half and a slot defined by the support providing a dovetail coupling therebetween when the first and second connector halves are mated and the corresponding device is mounted on the support, the dovetail coupling locking the first and second connector halves against separation but providing freedom for aligning movement and for removal of the second connector half with the first connector half.

5. An electrical installation comprising, in combination, a support, an electrical device demountably supported thereon, said device including one half of a separable connector fixed thereto and demountable therewith for receiving external connections thereto, a second separable connector half mating with the first-mentioned connector half and adapted to receive external connections to the said device, and interengaging means on the support and said second connector half providing a dovetail coupling therebetween when the first and second connector halves are mated and the said device is mounted on the support, the dovetail coupling locking the first and second connector halves against separation but providing freedom for aligning movement and for removal of the second connector half with the first connector half.

6. An electrical installation comprising, in combination, a support, an electrical device demountably supported thereon, said device including one half of a separable connector fixed thereto and demountable therewith for receiving external connections thereto, a second separable connector half mating with the first-mentioned connector half and adapted to receive external connections to the said device, and interengaging means on the support and said second connector half provided by a flange on the connector half and a slot defined by the support providing a dovetail coupling therebetween when the first and second connector halves are mated and the said device is mounted on the support, the dovetail coupling locking the first and second connector halves against separation but providing freedom for aligning movement and for removal of the second connector half with the first connector half.

References Cited in the file of this patent

UNITED STATES PATENTS

| | | |
|---|---|---|
| 1,809,025 | Cruser | June 9, 1931 |
| 2,253,700 | Graham | Aug. 26, 1941 |
| 2,467,828 | Hodgkins | Apr. 28, 1949 |

FOREIGN PATENTS

| | | |
|---|---|---|
| 134,516 | Austria | Aug. 25, 1933 |